(12) United States Patent
Yang et al.

(10) Patent No.: US 9,681,287 B2
(45) Date of Patent: Jun. 13, 2017

(54) METHOD FOR PROVIDING INFORMATION IN SYSTEM INCLUDING ELECTRONIC DEVICE AND INFORMATION PROVIDING SERVER, AND ELECTRONIC DEVICE THEREOF

(71) Applicant: SAMSUNG ELECTRONICS CO., LTD., Suwon-si (KR)

(72) Inventors: Jong-eun Yang, Seoul (KR); Won-chang Jang, Seoul (KR); Hae-dong Yeo, Hwaseong-si (KR); Jong-gyu Ham, Suwon-si (KR); Hee-seon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 14/169,668

(22) Filed: Jan. 31, 2014

(65) Prior Publication Data

US 2014/0213302 A1 Jul. 31, 2014

(30) Foreign Application Priority Data

Jan. 31, 2013 (KR) .................. 10-2013-0011262

(51) Int. Cl.
*H04W 24/00* (2009.01)
*H04W 8/02* (2009.01)
(Continued)

(52) U.S. Cl.
CPC .......... *H04W 8/02* (2013.01); *G06F 17/3087* (2013.01); *G06Q 50/01* (2013.01); *H04W 4/021* (2013.01);
(Continued)

(58) Field of Classification Search
CPC ......... H04W 4/02; H04W 4/14; H04W 4/206; H04W 64/00; H04W 4/021; H04W 4/023;
(Continued)

(56) References Cited

U.S. PATENT DOCUMENTS

2006/0271545 A1 11/2006 Youn et al.
2007/0281689 A1* 12/2007 Altman .............. G06Q 30/0207
455/435.1
(Continued)

FOREIGN PATENT DOCUMENTS

JP    2010204852 A    9/2010
JP    2011141610 A    7/2011
(Continued)

OTHER PUBLICATIONS

Communication, Issued by the European Patent Office, Dated Jul. 14, 2014, in counterpart European Application No. 14150435.7.

*Primary Examiner* — Fred Casca
(74) *Attorney, Agent, or Firm* — Sughrue Mion, PLLC (57) ABSTRACT

Exemplary embodiments may disclose a method for providing information in a system including an electronic device and an information providing server and an electronic device. The information providing method includes transmitting location information of a region that a user wishes to search and a local information request signal to the information providing server, by the electronic device, searching local information of the region using at least one social network service of at least one user located in the region, by the information providing server, in response to the local information request signal, transmitting the searched local information to the electronic device, by the information providing server, and displaying a local information user
(Continued)

interface (UI) using the local information received from the information providing server and a map of the region, by the electronic device.

8 Claims, 9 Drawing Sheets

(51) Int. Cl.
*G06Q 50/00* (2012.01)
*H04W 4/02* (2009.01)
*H04W 4/20* (2009.01)
*G06F 17/30* (2006.01)
*B44C 1/22* (2006.01)
*C04B 103/32* (2006.01)

(52) U.S. Cl.
CPC ............... *H04W 4/206* (2013.01); *B44C 1/22* (2013.01); *C04B 2103/32* (2013.01)

(58) Field of Classification Search
CPC ....... H04W 4/025; H04W 4/028; H04W 4/08; H04W 52/0212; H04W 52/0258; H04W 8/186; H04W 8/205; G06Q 50/01; G06Q 30/0229; G06Q 30/0201; G06Q 30/016; G06Q 30/0267; G06Q 30/0261; G06Q 30/0255; G06Q 30/0256; G06Q 30/0257; G06Q 30/0211; G06Q 30/0222; G06Q 30/0224; G06Q 30/0241; G06Q 50/12; H04L 51/32; H04L 67/02; H04L 51/03; H04N 21/4788; H04N 21/2396; H04N 21/25891; H04N 21/2668; H04N 21/2665
USPC .... 455/414.3, 435.1, 456.2, 456.3; 709/206; 340/439, 539.11; 379/142.06
See application file for complete search history.

(56) References Cited

U.S. PATENT DOCUMENTS

| | | | |
|---|---|---|---|
| 2008/0082264 | A1 | 4/2008 | Hill et al. |
| 2008/0102856 | A1 | 5/2008 | Fortescue et al. |
| 2008/0102857 | A1* | 5/2008 | Kim ................ G09B 29/007 455/456.3 |
| 2008/0133671 | A1 | 6/2008 | Kalaboukis |
| 2009/0241040 | A1* | 9/2009 | Mattila ................ G06F 3/0481 715/760 |
| 2010/0198869 | A1 | 8/2010 | Kalaboukis et al. |
| 2011/0125765 | A1* | 5/2011 | Tuli ................ G06F 17/30035 707/751 |
| 2011/0151868 | A1 | 6/2011 | Sun |
| 2011/0197200 | A1 | 8/2011 | Huang et al. |
| 2012/0005285 | A1* | 1/2012 | Lin ........................ G06Q 10/10 709/206 |
| 2012/0262277 | A1* | 10/2012 | Oliveira ................ H04L 67/18 340/8.1 |
| 2013/0066963 | A1* | 3/2013 | Odio ...................... G06Q 10/10 709/204 |
| 2013/0198277 | A1* | 8/2013 | Pedregal ............. G06Q 30/0282 709/204 |
| 2014/0281929 | A1* | 9/2014 | Grossman ............. G06F 17/212 715/243 |

FOREIGN PATENT DOCUMENTS

| | | |
|---|---|---|
| KR | 1020090025839 A | 3/2009 |
| KR | 1020110085205 A | 7/2011 |
| WO | 2009070138 A1 | 6/2009 |

\* cited by examiner

METHOD FOR PROVIDING INFORMATION IN SYSTEM INCLUDING ELECTRONIC DEVICE AND INFORMATION PROVIDING SERVER, AND ELECTRONIC DEVICE THEREOF

CROSS-REFERENCE TO RELATED APPLICATION

This application claims priority from Korean Patent Application No. 10-2013-0011262, filed in the Korean Intellectual Property Office on Jan. 31, 2013, the disclosure of which is incorporated herein by reference.

BACKGROUND

1. Field

Aspects of the exemplary embodiments relate to a method for providing information in a system including an electronic device and an information providing server and an electronic device thereof. More particularly, exemplary embodiments relate to a method for providing information in a system including an electronic device, which provides local information in real time using a social network service, and an information providing server and an electronic device thereof.

2. Description of the Related Art

In the related art, with the distribution of mobile devices (e.g., a smart phone, a tablet PC, etc.) and the establishment of network infrastructure, users may share their thoughts freely, without any limits of time and space. In particular, in the related art, as social network services, e.g., Twitter and Facebook have been developed, users are able to share their thoughts anywhere and anytime.

In the related art, people used to check local information of a specific area, such as weather information and traffic information, by looking at a specific homepage. In particular, local information, e.g., weather information and traffic information, is important information which needs to be provided in real time. However, weather information on a specific homepage in the related art is usually previously predicted information, instead of information which is updated in real time. Therefore, it is difficult for users to check current weather conditions, which are constantly changing.

Accordingly, a method for allowing users to check local information, such as weather information and traffic information, in real time is required.

SUMMARY

An aspect of the exemplary embodiments relates to an electronic device and a method for providing security to cloud data to prevent unauthorized access.

According to an aspect of the exemplary embodiments, a method for providing information in an information providing system including an electronic device and an information providing server includes transmitting location information of a region that a user wishes to search and a local information request signal to the information providing server, by the electronic device, searching local information of the region using at least one social network service of at least one user located in the region, by the information providing server, in response to the local information request signal, transmitting the searched local information to the electronic device, by the information providing server, and displaying a local information user interface (UI) using the local information received from the information providing server and a map of the region, by the electronic device.

The searching local information of the region may include searching at least one user located in the region based on the location information and searching the location information using at least one social network service of the at least one searched user.

The searching local information of the region may include searching the local information by searching whether there is a text related to the local information in response to text information in the at least one network service of the at least one user.

The searching local information of the region may include searching the local information by searching whether there is an image related to the local information in response to image data in the at least one network service of the at least one user.

In response to the local information being weather information, the searching local information of the region may include determining whether the image data is an external image, dividing the image data into a sky area and a ground area in response to determining that the image data is the external image, and searching color information and pattern information of the sky area in the weather information.

The local information UI may display an item corresponding to the local information on the map, and the displaying may include displaying a timeline UI with the local information of a selected region which corresponds to the item.

The local information may include at least one of weather information, performance information, festival information, restaurant information, tourist attraction information, and traffic information.

According to an aspect of the exemplary embodiments, an electronic device includes a communicator configured to communicate with an information providing server, an inputter configured to receive a user command, a displayer, and a controller which, in response to the user command requesting local information input through the inputter, transmits location information of a region that a user wishes to search and a local information request signal to the information providing server controls the communicator to receive the local information of the region searched in real time using at least one social network service, by the information providing server, in response to the local information request signal, and controls the displayer to display a local information user interface (UI) using the local information received from the information providing server and a map of the region.

The information providing server may search the local information by searching at least one user located in a region that the user wishes to search based on the location information, and searches the at least one social network service of the searched at least one user.

The information providing server may search the local information by searching whether there is a text related to the local information in response to text data in the at least one social network of at least one user located in the region.

The information providing server may search the local information by searching whether there is an image related to the local information in response to image data in the at least one social network of at least one user located in the region.

In response to the local information being weather information, the information providing server may determine whether the image data is an external image, and divides the image data into a sky area and a ground area in response to determining that the image data is the external image, extract the weather information based on color information and pattern information of the sky area, and transmit the extracted weather information to the electronic device.

The local information UI may display an item corresponding to the local information on the map, and the controller may control the displayer to sequentially display a timeline UI with the local information of a selected region which corresponds to the item.

The local information may include at least one of weather information, performance information, festival information, restaurant information, tourist attraction information, and traffic information.

According to an aspect of the exemplary embodiments, a method for providing information in a system including an electronic device and an information providing server includes transmitting a user written question to the information providing server to request local information, by the electronic device, analyzing location information of a region and the local information that a user wishes to search, by the information providing server, extracting at least one respondent user to the user written question by searching user information of other pre-registered users, by the information providing server, transmitting the user written question to at least one other electronic device which corresponds to the at least one extracted respondent user, by the information providing server, and receiving a response to the user written question by the at least one extracted respondent user from the at least one other electronic device, by the at least one other electronic device.

The method may include comparing the location information of the region that the user wishes to search with current location information of the at least one other electronic device, by the at least one other electronic device, and displaying the user written question in response to the at least one other electronic device being located in the region that the user wishes to search, by the at least one other electronic device.

The user information may be pre-registered in a server by the user and the other pre-registered users, or pre-generated based on usage information of the at least one electronic device of the user and the other pre-registered users.

The extracting may include extracting the at least one respondent user by comparing the location information with the information regarding a user location where the pre-registered other users are frequently located, extracting the at least one respondent user by comparing question type information with the information regarding an interested question of the pre-registered other users, and extracting the at least one respondent by analyzing a response pattern of the pre-registered other users.

The method may further include displaying the response to the user written question on an area on a map where the at least one extracted user who provides the response is currently located.

According to an aspect of an exemplary embodiment, a method for providing information in an electronic device includes transmitting location information of a region that a user wishes to search and a local information request signal to an information providing server; receiving searched local information from the information providing server; and displaying a local information user interface (UI) using the searched local information received from the information providing server and a map of the region. The searched local information from the information providing server may include local information of the region provided by at least one user located in the region.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION OF EXEMPLARY EMBODIMENTS

It should be observed that the method steps and system components have been represented by related art symbols in the figure. Therefore, only specific details are shown, which are relevant for an understanding of the present disclosure. Further, details that may be readily apparent to a person of ordinary skill in the art may not have been disclosed. In the present disclosure, relational terms such as first, second, etc., may be used to distinguish one entity from another entity, without necessarily implying any actual relationship or order between such entities.

Figure 1:
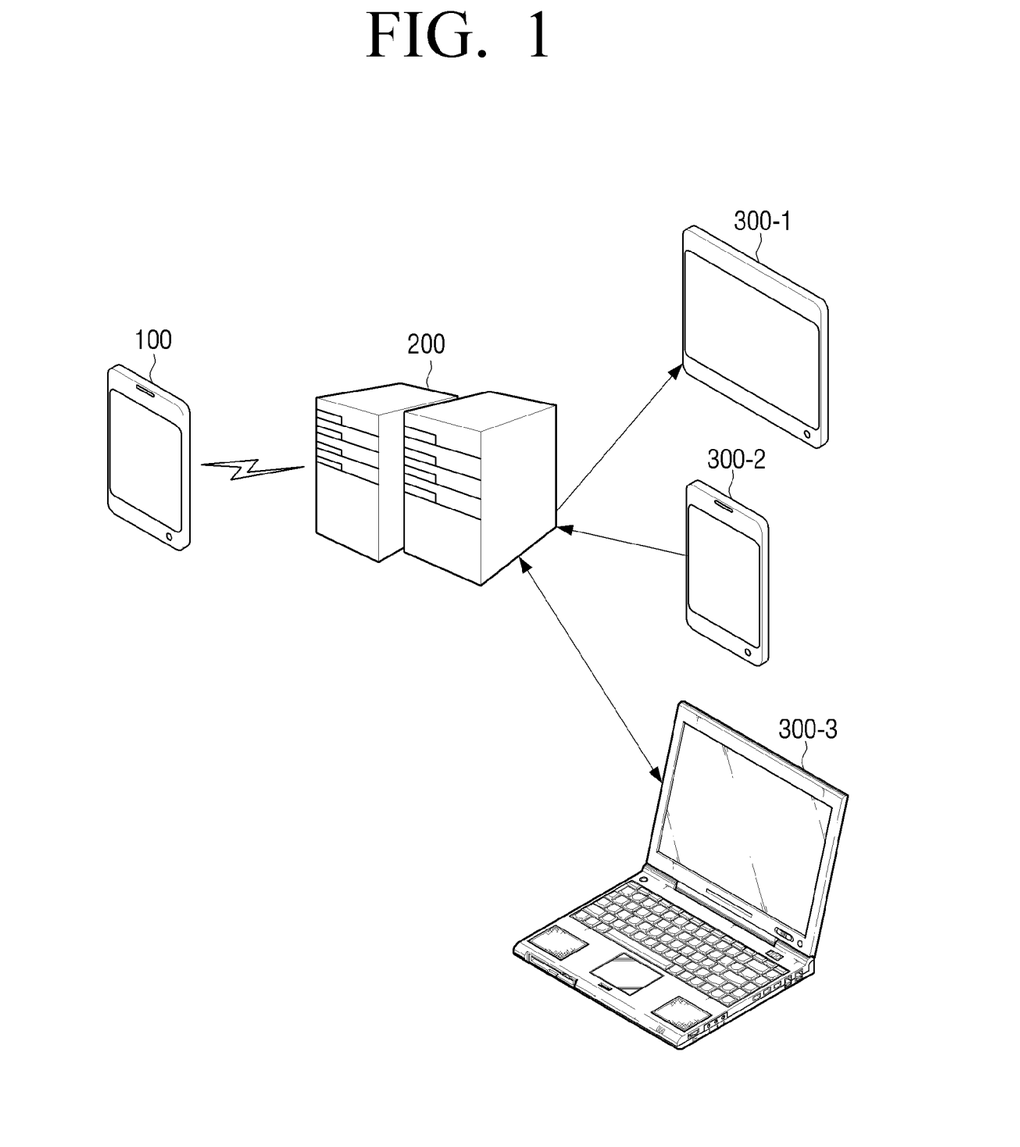
FIG. 1 is a view illustrating an information providing system according to an exemplary embodiment.

FIG. 1 is a view illustrating an information providing system according to an exemplary embodiment. As illustrated in FIG. 1, an information providing system comprises an electronic device 100, an information providing server 200, and a plurality of other electronic devices 300-1, 300-2, 300-3, which provide local information. In this case, the electronic device 100 may be mobile terminal devices, e.g., a smart phone and a tablet PC. However, the electronic device is only an example. Further, the electronic device may be another electronic device, e.g., a smart TV, a desktop PC, and a notebook PC.

According to an exemplary embodiment, when a user command to search local information is input, the electronic device 100 transmits location information of a region that a user wishes to search, along with a local information request signal to the information providing server 200. In this case, the local information may include information, such as weather information and traffic information, which needs to be provided in real time. However, the local information disclosed is only an example. The local information may also include various information, such as performance information, festival information, restaurant information, tourist destination information, emotion sharing information, etc.

When location information of a region that a user wishes to search and a local information request signal are received from the electronic device 100, the information providing server 200 searches location information of the region that the user wishes to search using a social network service of users in the region that the user wishes to search. In particular, the information providing server 200 may search users who are currently located in the region that the user wishes to search, according to the location information received from the electronic device 100 and location information of other electronic devices 300-1, 300-2, 300-3 (e.g., GPS information). In addition, the information providing server 200 may search location information by extracting contents related to the location information from social network services of users who are currently located in the region that the user wishes to search. For example, if a user of the electronic device 100 requests weather information of region A, the information providing server 200 may search weather information of region A by searching users in region A, and determining whether there is text or an image related to weather in social network services of the users in region A.

Meanwhile, the information providing server 200 may receive social network service information from a plurality of other electronic devices 300-1, 300-2, 300-3, and store the information in order to obtain social network service information of users who are currently located in the region that the user wishes to search.

In addition, the information providing server 200 transmits the searched local information to the electronic device 100.

When the local information is received from the information providing server 200, the electronic device 100 may display a local information user interface (UI) using the local information received from the information providing server 200 and a pre-stored map. In this case, the local information UI may display on a map an item corresponding to local information of the region that the user wishes to search. When the item is selected, the electronic device 100 may display a timeline UI which shows the location information of the region that the user wishes to search sequentially.

Accordingly, the user may check the local information of the region that the user wishes to search, through the local information UI, on a real time basis.

According to another exemplary embodiment, the electronic device 100 transmits a question prepared by a user to request local information to an information providing server.

When the question requesting location information is received, the information providing server 200 analyzes location information and location information of the region that the user wishes to search from the question. Specifically, the information providing server 200 analyzes the question to identify the region which the user wishes to search and the local information which the user requests. For example, if the question "What is the traffic like in region B?" is received, the information providing server 200 may extract "region B" from the question as location information of the region that the user wishes to search, and may extract "traffic information" as local information that the user requests.

In addition, the information proving server 200 extracts a respondent for the question by searching user information of other pre-registered users. For example, if the local information that a user requests is food information, the information providing server 200 may extract respondent users who are interested in food, among other users. In another exemplary embodiment, if the local information that a user requests is traffic or weather information, the information providing server 200 may extract users whose house or office are located in the region or who frequently visit the region that the user wishes to search as respondents, among other users.

Meanwhile, the user information may be registered in an information providing server 300 by an existing user, or may be analyzed according to the user information of other users using the electronic device 300, and then registered in the information providing server 200. For example, the information providing server 200 may store an address, a company address, and a field of interest, which are pre-registered as user information by users. In addition, the other electronic device 300 may obtain user information by analyzing a movement path using GPS information of other electronic devices 300 that are used by other users, analyzing a search word used most frequently by users, or analyzing a web site which is visited most frequently by users, and transmit the obtained user information to the information providing server 200. For example, when a search word, which is used most frequently by users is related to food, or a web site visited most frequently by users is related to food, the electronic device 100 may obtain 'food' which is the field of interest of the user as user information, and transmit the information regarding the field of interest to the information providing server 200.

The information providing server 200 transmits a question to other electronic devices 300-1, 300-2, 300-3, corresponding to the extracted respondents.

Subsequently, other electronic devices 300-1, 300-2, 300-3 compare location information of the region that the user wishes to search and the current location information of other electronic devices 300-1, 300-2, 300-3. Specifically, other electronic devices 300-1, 300-2, 300-3 may compare location information of the region that the user wishes to search, which is received from the information providing server 200, and the location information (for example, GPS information) of other electronic devices 300-1, 300-2, 300-3, which is collected in real time.

In addition, a question may be displayed only on other electronic devices, which are located in the region that the user wishes to search (or other electronic devices which are located within a predetermined distance in the region that he user wishes to search). For example, if the region that the user wishes to search is Region A, a question may be displayed only on other electronic devices located in Region A, among other electronic devices 300-1, 300-2, 300-3. Since the information regarding where other electronic devices are currently located is private, there may be an issue if an information providing server collects this information. Thus, whether other electronic devices are currently located in the region that the user wishes to search may be determined by other electronic devices.

In addition, when a response to the question is made by one or more users, at least one other electronic device 300 transmits the response to the electronic device 100.

The electronic device 100 receives a response to the question from one or more respondents. In this case, the electronic device 100 may display a response to the question on a map, regarding the region that the user wishes to search.

Accordingly, the user may be provided with local information of the region that the user wishes to search, from other users located in the region.

Hereinafter, an exemplary embodiment will be explained, where the electronic device 100 displays a local information UI is displayed based on local information received from the information providing server 200.

Figure 2:
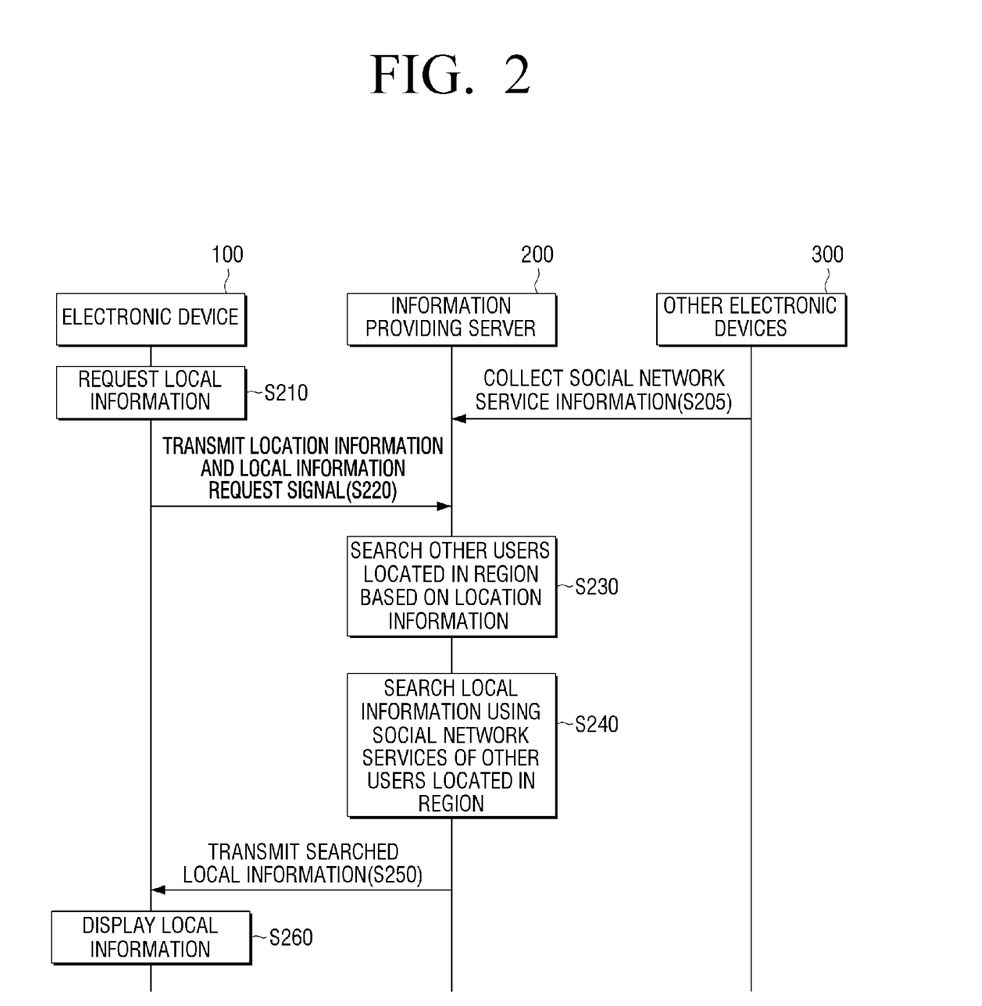
FIG. 2 is a sequence view provided to explain a method for providing information in an information providing system according to an exemplary embodiment.

FIG. 2 is a sequence view provided to explain a method for providing information in an information providing system according to an exemplary embodiment.

First, the information providing server 200 collects social network service information from other electronic devices 300 (S205). In this case, the social network service may be Twitter, Facebook, foursquire, instagram, etc. However, other social network services may be included in the exemplary embodiment. In particular, the information providing server 200 may collect social network service information from other electronic devices 300 in real time.

The electronic device 100 receives a local information request (S210). In this case, the electronic device 100 may receive information regarding a region and location information, which a user wishes to search. For example, the electronic device 100 may receive "Hwagok-dong, Gangseo-gu, Seoul" as information regarding a region that a user wishes to search, and may receive "weather information" as local information that a user wishes to search.

In addition, the electronic device 100 transmits the input location information and local information request signal to the information providing server 200 (S220).

The information providing server 200 searches other users located in the region that the user wishes to search based on the location information (S230). Specifically, if the region that the user wishes to search is "Hwagok-dong, Gangseo-gu, Seoul", the information providing server 200 may search other users currently located in "Hwagok-dong, Gangseo-gu, Seoul" using location information (e.g., GPS information) included in metadata of social network service information, received from other electronic device 100.

In addition, the information providing server 200 searches local information using a social network service of other users, located in the region that the user wishes to search (S240), which will be explained in detail with reference to FIG. 3.

Figure 3:
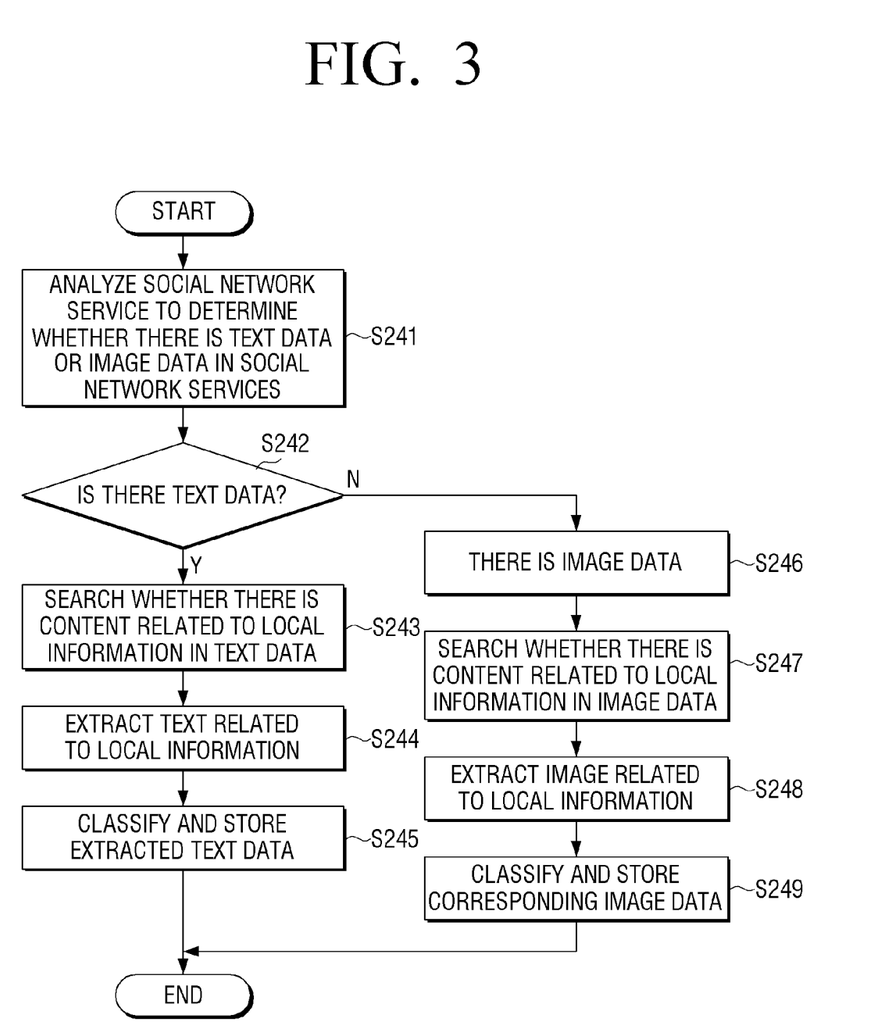
FIG. 3 is a flowchart provided to explain a method that an information providing server employs to search local information using a social network service according to an exemplary embodiment.

FIG. 3 is a flowchart provided to explain a method that an information providing server employs to search local information, using a social network service according to an exemplary embodiment.

First, the information providing server 200 analyzes a social network service in order to determine whether text data or image data exists in collected social network services (S241).

Subsequently, the information providing server 200 determines whether text data exists in the collected social network services (S242).

When there is text data (S242-Y), the information providing server 200 searches to determine whether there is content related to local information in the text data (S243). For example, if the location information that a user wishes to search is weather information, the information providing server 200 may search whether there is a content related to weather information (for example, "rain", "snow", "wind", and so on) in the text data.

Subsequently, the information providing server 200 extracts texts related to the local information (S244). For example, the information providing server 200 may extract texts such as "rain", "snow", "wind", "cold", "hot", etc., which are texts related to weather information, from the text data.

The information providing server 200 categorizes and stores the extracted texts (S245). For example, the information providing server 200 may categorize social network services, including "rain" and "umbrella" from among the text data under "rain", as weather information.

However, when there is no text data in the social network services (S242-N), the information providing server 200 determines whether there is image data (S246).

Subsequently, the information providing server 200 searches whether there is a content related to local information in image data. For example, if local information that a user wishes to search is weather information, the information providing server 200 may separate the image data into a ground area and a sky area based on pattern and color information of the image data. Afterwards, the information providing server 200 may search a content related to weather information by analyzing the color and pattern of the sky area. For example, if the color of the sky area is blue, or snows are scatter in the sky area, the information providing server 200 may search a content related to weather information.

Subsequently, the information providing server 200 extracts an image related to local information (S248). In other words, the information providing server 200 may extract image data related to weather information, among a plurality of image data.

The information providing server 200 categorizes and stores corresponding image data (S249). For example, the information providing server 200 may categorize and store social network services, including image data where there are snows in a sky area under a "snow" item, as weather information.

Referring back to FIG. 2, the information providing server 200 transmits the searched local information as described in FIG. 3 to the electronic device 100 (S250). In this case, the information providing server 200 may directly transmit social network service information as local information, and transmit a categorized content. For example, the information providing server 200 may directly transmit to the electronic device 100 a comment of a social network service, "it snows in Gangseo-gu", and transmit "snow" as weather information in "Gangseo-gu" to the electronic device 100.

In addition, the information providing server 200 may transmit not only local information, which is searched using social network services, but also location information, which is obtained by using other methods. For example, if local information that a user wishes to search is weather information, the information providing server 200 may transmit weather information obtained from the National Weather Service, image data photographed by CCTV, and location information which is searched by using social network services.

Figure 4:
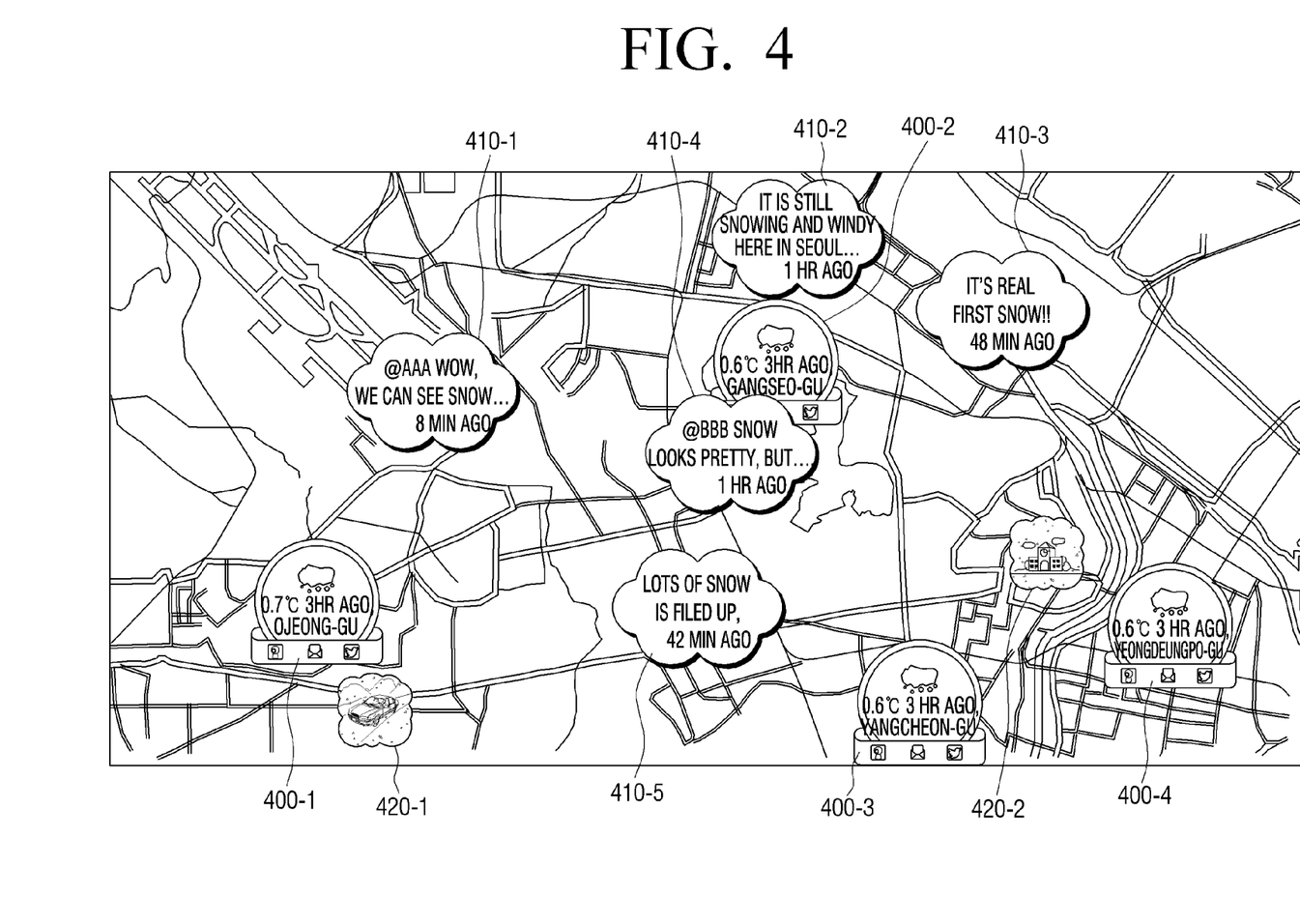
FIG. 4 is a view illustrating a local information user interface (UI) which is provided by an electronic device according to an exemplary embodiment.

Subsequently, the electronic device 100 displays a local information UI by using the received local information and a map (S260). In this case, the local information UI includes an item representing local information at an area where other users are currently located on the map. For example, as illustrated in FIG. 4, if the local information which a user wishes to search is "weather information in Hwagok-dong, Gangseo-gu, Seoul", the electronic device 100 may display a local information UI. In this case, the item displayed on the local information UI may include items 400-1, 400-2, 400-3, 400-4 corresponding to the weather information received from the National Weather Service, items 410-1, 410-2, 410-3, 410-4, 410-5 corresponding to the social network services including weather information, and items 420-1, 420-2 corresponding to the weather information obtained by CCTV.

Figure 5:
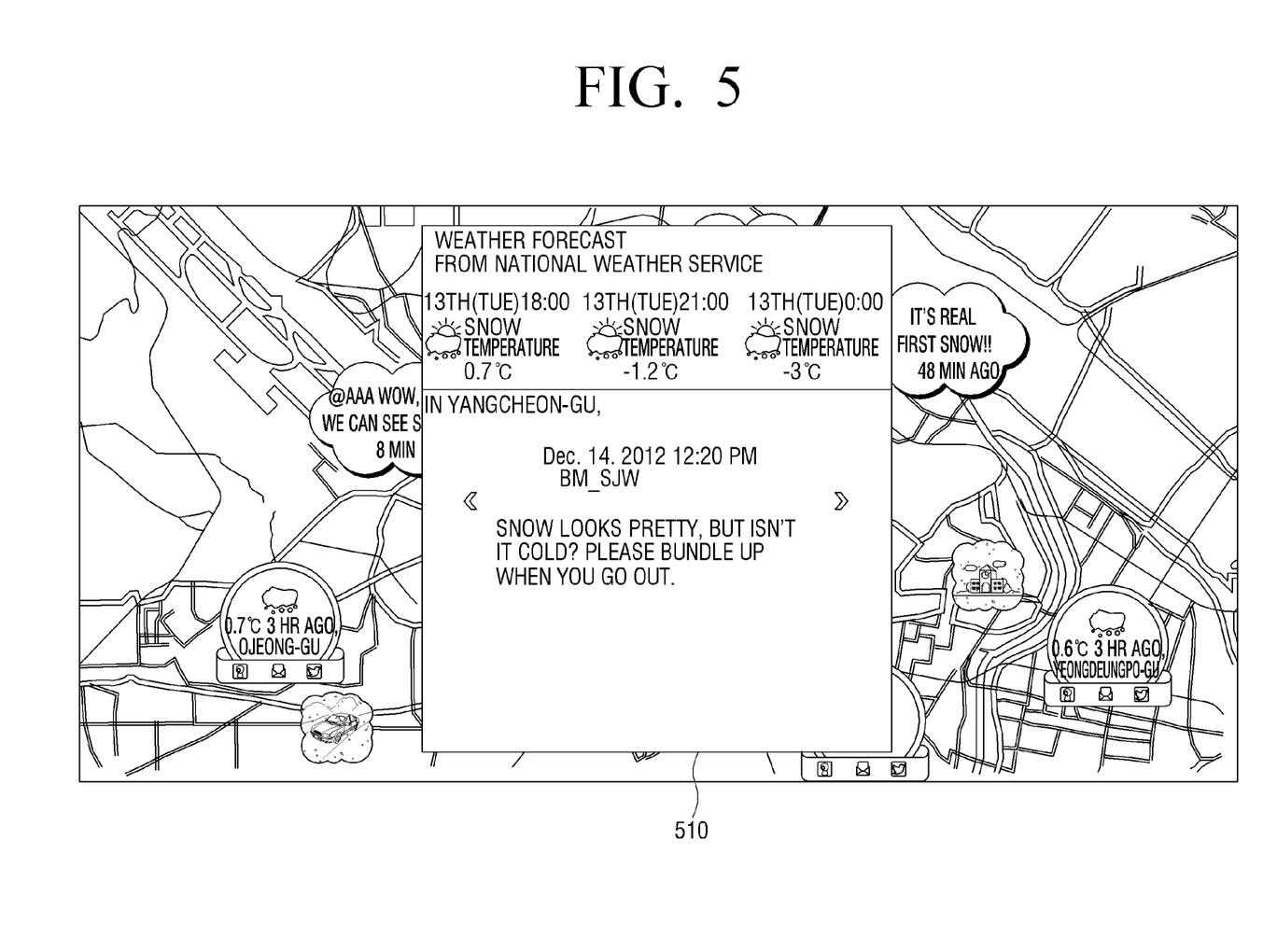
FIG. 5 is a view illustrating a timeline UI which is provided by an electronic device according to an exemplary embodiment.

If one of the items displayed on the local information UI is selected, the electronic device 100 may display a timeline UI which sequentially displays local information of the region of the selected item. For example, as illustrated in FIG. 5, if one of the items corresponding to the social network services including weather information is selected, the electronic device may display a timeline UI 510, which sequentially displays location information of the region corresponding to the selected item.

As described above, local information, which is searched using social network service information of other users, is provided through a local information UI. Thus, a user may check local information of a region that the user wishes to search in real time.

Hereinafter, with reference to FIGS. 6 and 7, an exemplary embodiment where local information is received directly from other users, as the information providing server 200 transmits a question requesting for local information to other users in the corresponding region, will be explained.

Figure 6:
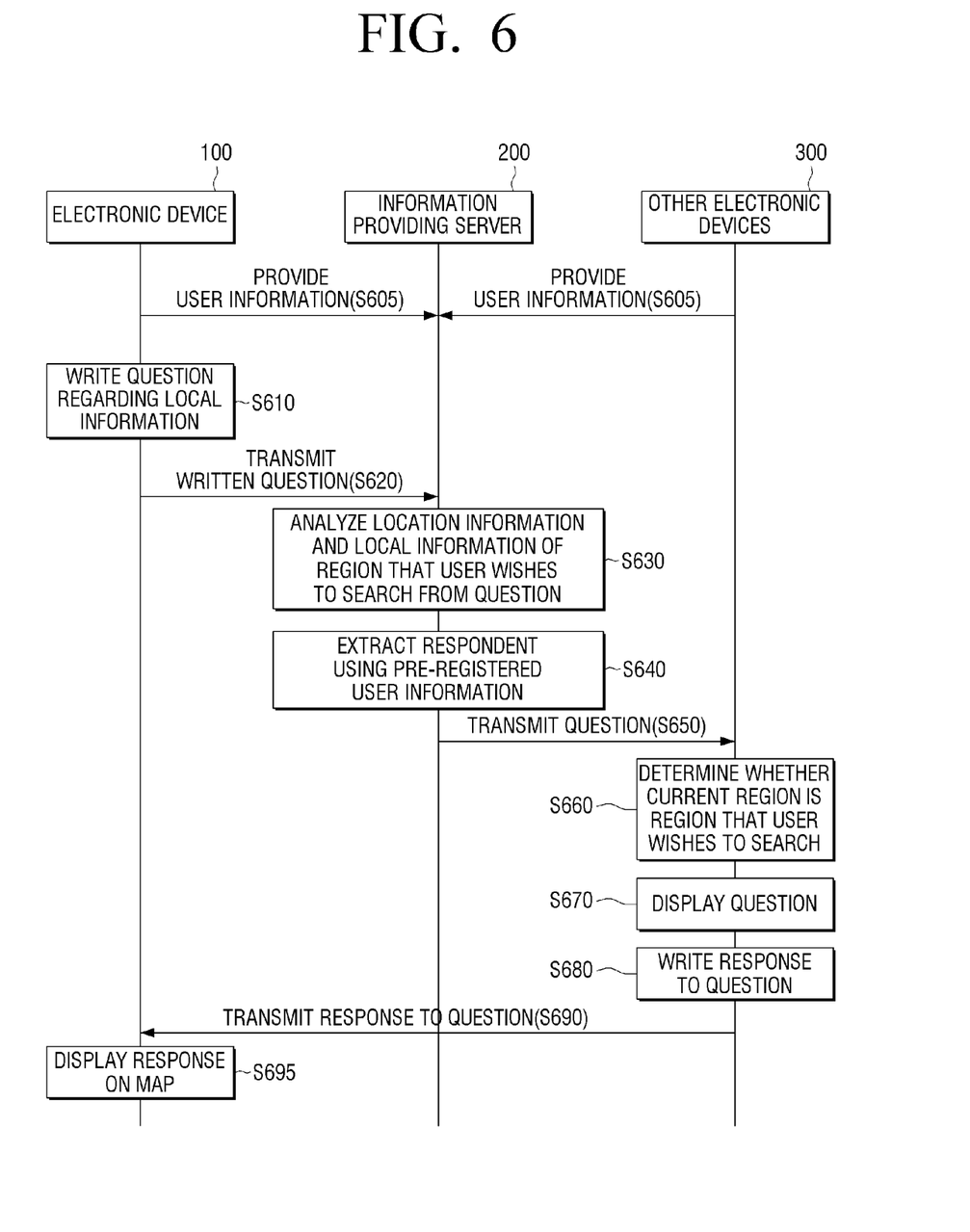
FIG. 6 is a sequence view provided to explain a method for providing information in an information providing system according to another exemplary embodiment.
Figure 7:
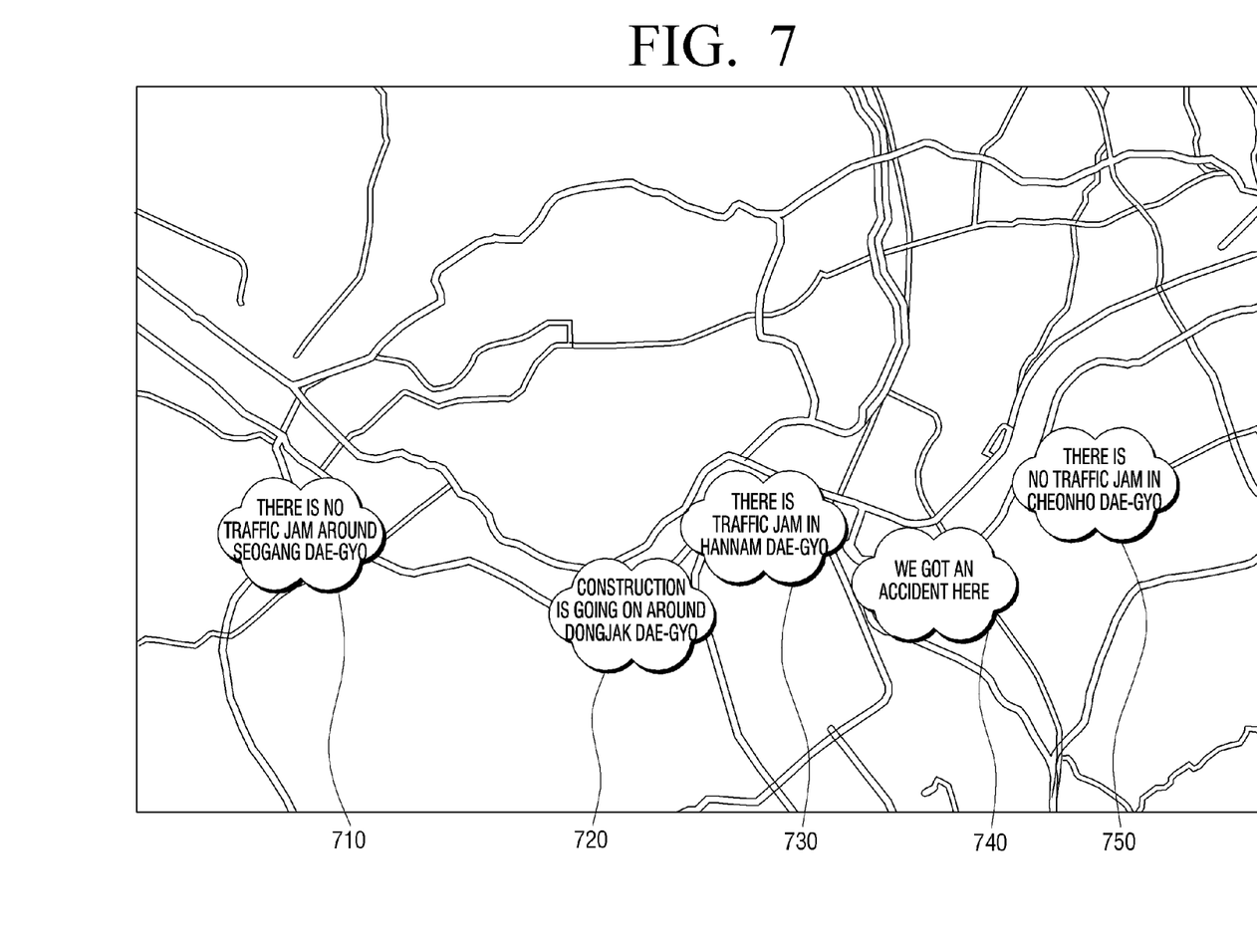
FIG. 7 is a view illustrating a reply to a question provided by an electronic device on a map according to another exemplary embodiment.

FIG. 6 is a sequence view provided to explain a method for providing information in an information providing system, according to another exemplary embodiment.

First, the information providing server 200 receives user information from electronic devices 100, 300 (Step S605). In this case, the user information may include an address of the user, company, field of interest, hobby, and movement path, and the user information may be input directly from the user, or may be obtained by the electronic devices 100, 300 through electronic device usage information of users. For example, the electronic devices 100, 300 may obtain user information by analyzing a movement path using GPS information of electronic devices of users, analyzing a search word which is frequently used by users, analyzing application usage information of the electronic devices 100, 300, or analyzing a web site which is visited frequently by users, and transmit the obtained user information to the information providing server 200. For example, if a search word frequently used by users relates to food, or a web site frequently visited by users relates to food, the electronic device 100 may obtain 'food' which is the field of interest of the user as user information, and transmit the information regarding the field of interest to the information providing server 200.

The electronic device 100 writes a question regarding local information by a user input (S610). In this case, the question regarding local information may be a general assertive sentence, or may be an interrogative sentence such as "How is the traffic condition in Olympic-daegyo?".

Subsequently, the electronic device 100 transmits the question to the information providing server 200 (S620).

The information providing server 200 analyzes location information and local information of the region that a user wishes to search from the question (S630). In particular, the information providing server 200 may analyze location information and local information of the region that a user wishes to search by analyzing a text. For example, if a question, "How is the traffic condition in Olympic-daegyo?" is received, the information providing server 200 may analyze the text to extract location information of the region that the user wishes to search through the text of "Olympic-daegyo", and extract the traffic information as local information that the user wishes to search through the text of "traffic". If a question does not include location information of the region that the user wishes to search, the information providing server 200 may determine that the current location information of the electronic device 100 is the location information of the region that the user wishes to search.

Subsequently, the information providing server 200 extracts a respondent using pre-registered user information (S640). In particular, the information providing server 200 may extract a respondent to the user question by comparing pre-registered user information with location information and local information. In particular, the information providing server 200 may extract a respondent by comparing location information of the region that a user wishes to search with information where other pre-registered users are located frequently. For example, the information providing server 200 may compare location information of the region that a user wishes to search with an address, a company and movement path of pre-registered users in order to extract other users having the same address, a company and movement path as the region that the respondent user wishes to search. In addition, the information providing server 200 may extract a respondent by comparing question type information with information regarding an interested question of pre-registered users. For example, if the question type information of local information is "traffic information", the information providing server 200 may extract other respondent users whose registered question of interest is "traffic" and "car", among other users. In addition, the information providing server 200 may extract a respondent by analyzing a response pattern of other users. For example, if a question is transmitted at the close time of office hours, the information providing server 200 may extract other respondent users who frequently respond at the close time of office hours.

Subsequently, the information providing server 200 transmits a question corresponding to the extracted respondent to other electronic device 300 (S650).

The other electronic device 300 determines whether the current location is the region that the user wishes to search (S660). In particular, as the region where the electronic device 100 is currently located is information which is private, the information is not selected by the information providing server 200. Instead, the electronic device 100 may directly compare location information of the region that a user wishes to search, which is received from the information providing server 200 with its current location information (e.g., GPS information) in order to determine whether the other electronic device 300 is located in the region that the user wishes to search.

If the other electronic device 300 is located in the region that the user wishes to search, the electronic device 300 displays a question (S670). If the other electronic device 300 is not located in the region that the user wishes to search, the other electronic device 300 may not display a question.

In addition, the electronic device 300 writes a response to the question by a user input (S680).

Subsequently, the other electronic device 300 transmits a response to the question to the electronic device 100 (S690). In this case, it is only an exemplary embodiment that the other electronic device 300 directly transmits a response to the question to the electronic device 100. The other electronic device 300 may transmit a response to the question to the information providing server 200, and the information providing server 200 may transmit the response to the question to the electronic device 100.

The electronic device 100 displays the response to the question on a map (S695). Specifically, as shown in FIG. 7, if the question is "How is the traffic condition in Olympic-daegyo?", the electronic device 100 may display responses 710, 720, 730, 740, 750, which are transmitted from the corresponding other electronic device 300 on an area where the at least one other electronic device 300 is located on the map.

As described above, if a user writes a question regarding local information, other users located in the corresponding region may transmit a response to the question right away. Thus, the user may obtain the local information in real time.

Hereinafter, the configuration of the electronic device 100 and the information providing server 200 will be explained in greater detail with reference to FIGS. 8 and 9.

Figure 8:
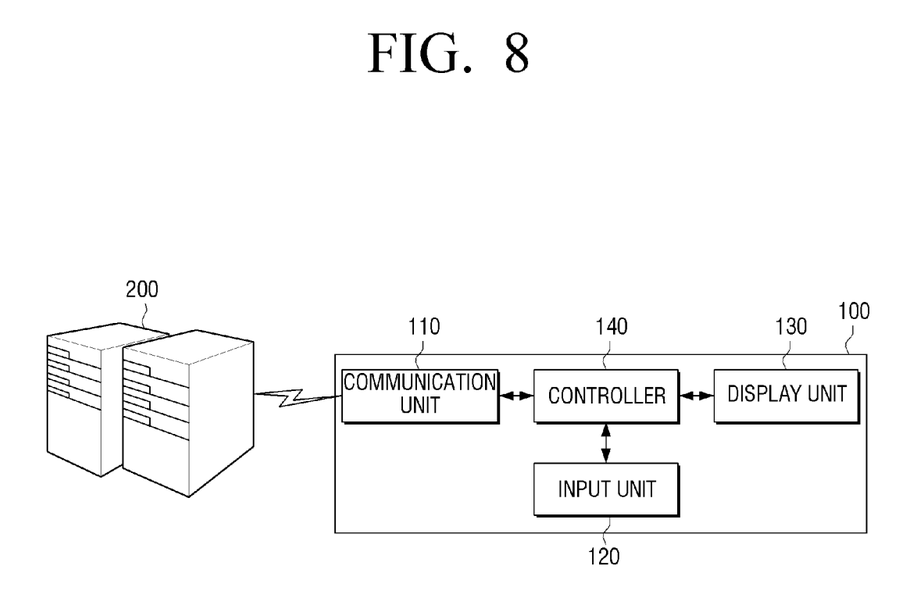
FIG. 8 is a block diagram illustrating configuration of an electronic device according to an exemplary embodiment.

FIG. 8 is a block diagram illustrating a configuration of an electronic device according to an exemplary embodiment. As illustrated in FIG. 8, the electronic device 100 comprises a communication unit 110, an input unit 120, a display unit 130, and a controller 140.

FIG. 2 illustrates various components of the electronic device 100 based on the assumption that the electronic device 100 is an apparatus having an information providing function using social network services. Accordingly, depending on exemplary embodiments, some of the components illustrated in FIG. 2 may be omitted or changed, or other components may be added.

The communication unit 110 is a component which communicates with various types of external devices (e.g., the information providing server 200 and other electronic devices 300-1, 300-2, 300-3) according to various types of communication methods. In particular, the communication unit 110 may include various communication chips such as WiFi chip, Bluetooth chip, NFC chip, wireless communication chip, etc. In this case, the WiFi chip, the Bluetooth chip, and the NFC chip perform communication according to a WiFi method, a Bluetooth method, and an NFC method respectively. The NFC chip refers to a chip which operates according to an NFC method using 13.56 MHz among various RF-ID frequency bands, such as 135 kHz, 13.56 MHz, 433 MHz, 860-960 MHz, 2.45 GHz, etc. When the WiFi chip or the Bluetooth chip is used, various connection information, e.g., SSID, session key, etc., is received/transmitted in advance so that various information can be received/transmitted after communication is established using the connection information. The wireless communication chip refers to a chip which performs communication according to various communication standards such as IEEE, Zigbee, 3G (3rd Generation), 3GPP (3rd Generation Partnership Project), LTE (Long Term Evolution), and so on. However, exemplary embodiments are not limited. The communication unit 110 may include a processor, a hardware module, or a circuit for performing the respective functions.

The input unit 120 may receive a user command to control overall operations of the electronic device 100. In particular, the input unit 120 may receive a question regarding local information of the region that a user wishes to search, and a response to the question. In this case, the input unit 120 may be realized as a touch screen. However, this is only an example. The input unit 120 may also be realized as other input apparatuses which can control the electronic device 100, e.g., a motion input unit, a voice input unit, a digital pen, a mouse, etc. However, exemplary embodiments are not limited. The input unit 120 may include a processor, a hardware module, or a circuit for performing the respective functions.

The display unit 130 outputs image data under the control of the controller 140. In particular, as illustrated in FIG. 3, the display unit 130 may display a local information UI. As illustrated in FIG. 4, the display unit 130 may also display a timeline UI. In addition, the display unit 130 may display a map including a response to the question as illustrated in FIG. 7. However, exemplary embodiments are not limited. The display unit 130 may include a processor, a hardware module, or a circuit for performing the respective functions.

The controller 140 controls overall operations of the electronic device 100 according to a user command input to the input unit 120.

In particular, according to an exemplary embodiment, when a user command requesting local information is input through the input unit 120, the controller 140 may control the communication unit 110 to transmit location information of the region that a user wishes to search and a local information request signal to the information providing server. In addition, the controller 140 may control the communication unit 110 to receive local information of the region that the user wishes to search, which the information providing server 200 searches in real time using social network services in response to the local information request signal, from the information providing server 200. Further, the controller 140 may control the display unit 130 to display a local information UI using the local information received from the information providing server 200, and a map of the region that the user wishes to search.

In another exemplary embodiment, if a question requesting local information is input through the input unit 120, the controller 140 may control the communication unit 110 to transmit the question to the information providing server 200. Subsequently, the information providing server 200 may extract a respondent by analyzing the question, and transmitting the question to the extracted respondent. If the extracted respondent transmits a response to the question, the controller 140 may control the display unit 130 to display the response to the question on an area on the map where the respondent is currently located.

Figure 9:
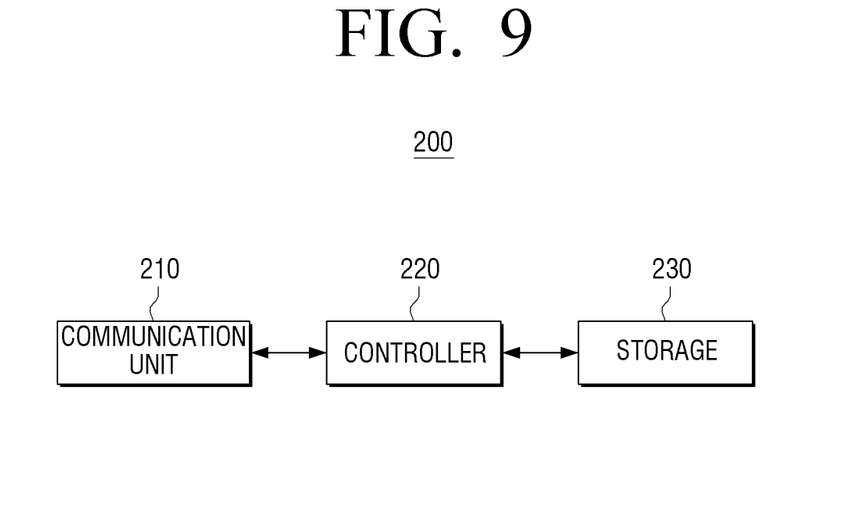
FIG. 9 is a block diagram illustrating configuration of an information providing server according to an exemplary embodiment.

FIG. 9 is a block diagram illustrating configuration of the information providing server 200 according to an exemplary embodiment. As illustrated in FIG. 9, the information providing server 200 comprises a communication unit 210, a storage 220, and a controller 230.

The communication unit 210 performs communication with various electronic devices 100, 300-1, 300-2, 300-3 according to various types of communication methods. In particular, the communication unit 210 may perform communication with the electronic devices using various communication methods, such as WiFi communication method, Bluetooth communication method, wireless communication method, etc. However, exemplary embodiments are not limited. The communication unit 210 may include a processor, a hardware module, or a circuit for performing the respective functions.

The storage 230 stores various programs and modules to drive the information providing server 200. In addition, the storage 230 may store database regarding user information, and may receive and store social network service information of users in real time.

The controller 220 controls overall operations of the information providing server 200.

In particular, if location information of the region that a user wishes to search and a local information request signal are transmitted from the electronic device 100 in an exemplary embodiment, the controller 220 may search users who are located in the region where the user wishes to search, based on the location information of the region that the user wishes to search. In addition, the controller 220 may search local information using social network services of the users who are located in the region that the user wishes to search. Since this operation has been explained in detail with reference to FIGS. 3 and 4, further description will not be provided. The controller 220 may control the communication unit 210 to transmit the searched local information to the electronic device 100.

In another exemplary embodiment, if the electronic device 100 transmits a question regarding local information, the controller 220 may analyze location information and local information of the region that a user wishes to search from the question. Subsequently, the controller 220 may extract a respondent by comparing pre-registered user information with the analyzed location information and local information of the region that the user wishes to search. The controller 220 may control the communication unit 210 to transmit the question to the other electronic device 300, corresponding to the extracted respondent.

As described above, the electronic device 100 and the information providing server 200 allow a user to check local information, such as weather information and traffic information, which needs to be provided in real time.

Meanwhile, a program code for performing the above-mentioned information providing method according to various exemplary embodiments may be stored in various types of recording media which can be readable by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, CD-ROM, etc.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than restrictive. All such possible modifications are intended to be included within the scope of present disclosure.

What is claimed is:

1. A method for providing information in an information providing system including an electronic device and an information providing server, comprising:
   transmitting location information of a region to search and a local information request to the information providing server, by the electronic device;
   searching local information of the region using a social network service, by the information providing server, based on the location information and the local information request;
   transmitting the searched local information to the electronic device, by the information providing server; and
   displaying a local information user interface (UI), on a map of the region, based on the local information received from the information providing server, by the electronic device, wherein the searched local information from the information providing server includes local information of the region provided to the social network service by at least one user of the social network service currently located in the region;
   wherein the local information UI is displayed on the map of the region at a position corresponding to a current location of the at least one user of the social network service,
   wherein the searching local information of the region comprises: searching the local information by searching whether there is a text or image related to the local information in response to text information in the social network service of the at least one user,
   wherein the local information UI displays an item corresponding to the local information on the map, and
   wherein the displaying comprises displaying a timeline UI with the local information of a selected region which corresponds to the item.

2. The method as claimed in claim 1, wherein the searching local information of the region comprises:
   searching at least one user located in the region based on the location information; and
   searching the location information using the social network service of the at least one searched user.

3. The method as claimed in claim 1, wherein the searching local information of the region comprises: searching the local information by searching whether there is an image related to the local information in response to image data in the social network service of the at least one user.

4. The method as claimed in claim 3, in response to the local information being weather information, the searching local information of the region comprises:
   determining whether the image data is an external image;
   dividing the image data into a sky area and a ground area in response to determining that the image data is the external image; and
   searching color information and pattern information of the sky area in the weather information.

5. The method as claimed in claim 1, wherein the local information includes at least one of weather information, performance information, festival information, restaurant information, tourist attraction information, and traffic information.

6. A method for providing information in an electronic device, the method comprising:
   transmitting location information of a region to search and a local information request to an information providing server by the electronic device;
   receiving searched local information provided on a social network service by the electronic device from the information providing server; and
   displaying by the electronic device a local information user interface (UI), on a map of the region, based on the searched local information received from the information providing server,
   wherein the searched local information from the information providing server includes local information of the region provided to the social network service by at least one user of the social network service currently located in the region,
   wherein the local information UI is displayed on the map of the region at a position corresponding to a current location of the at least one user of the social network service,
   wherein the local information is searched by searching whether there is a text or image related to the local information in response to text information in the social network service of the at least one user,
   wherein the local information UI displays an item corresponding to the local information on the map,
   wherein the displaying comprises displaying a timeline UI with the local information of a selected region which corresponds to the item.

7. The method as claimed in claim 6, wherein the local information of the region from the information providing server is provided using the social network service which corresponds with the at least one user located in the region.

8. The method as claimed in claim 6, wherein the local information transmitted by the electronic device includes at least one of weather information, performance information, festival information, restaurant information, tourist attraction information, and traffic information.

* * * * *